G. F. ALBERT.
DISPLAY DEVICE.
APPLICATION FILED AUG. 11, 1917.

1,253,456.

Patented Jan. 15, 1918.

Inventor
George F. Albert

UNITED STATES PATENT OFFICE.

GEORGE F. ALBERT, OF PITTSBURGH, PENNSYLVANIA.

DISPLAY DEVICE.

1,253,456.      Specification of Letters Patent.      Patented Jan. 15, 1918.

Application filed August 11, 1917. Serial No. 185,749.

*To all whom it may concern:*

Be it known that I, GEORGE F. ALBERT, a citizen of the United States, and a resident of Pittsburgh, Pennsylvania, have invented certain new and useful Improvements in Display Devices, of which the following is a specification.

My invention is a display device intended to be utilized to give the effect of a hamper or other form of receptacle filled with fruit, vegetables or the like, while as a matter of fact the hamper or receptacle contains a readily adjustable section which may support only a thin layer of the articles to be displayed but is capable of ready adjustment so as to increase the capacity of the receptacle.

I have illustrated the invention in the accompanying drawings showing two forms of the device and these are illustrative of other modifications.

In these drawings,

Figure 1 is a sectional view of a receptacle containing my invention, while

The receptacle A may represent a hamper, barrel, cask, basket or any ordinary container for the material to be displayed which may be fruit, vegetables or other foods though I do not limit myself in this connection as the receptacles may be of smaller size and adapted to display other articles.

I use a movable bottom or section $a'$ which is adjustable in order to increase or diminish the space above the same thus requiring only a thin layer of goods to fill the space should this be desired, or by lowering the section $a'$, a larger space will be provided to be filled in with the goods to be displayed. By thus adjusting the movable section the receptacle may be also utilized for storage purposes.

Figure 1:
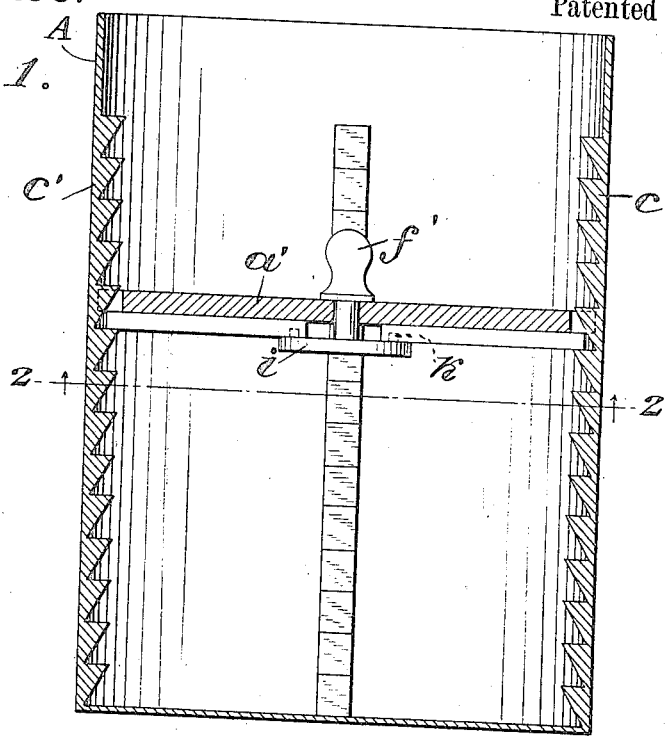
Figure 2:
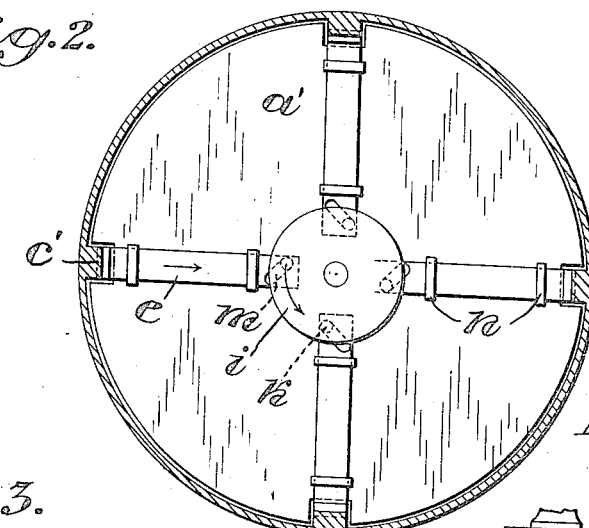
Fig. 2 is a sectional view on line 2—2 Fig. 1.
Figure 3:
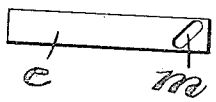
Fig. 3 is a view of one of the arms.

In the form shown in Figs. 1, 2 and 3, I utilize rack bars $c'$, extending lengthwise of the receptacle. The movable section $a'$ has secured to it arms $e$ which engage the rack bars $c'$. A turning knob $f'$ extends through the movable section $a'$ and has fixed on its lower end a disk $i$ provided with pins $k$ which work in inclined slots $m$ in the arms $e$ supported in suitable guides $n$. When the proper height has been reached the turning knob $f'$ is turned slightly so that the arms $e$ will engage with the rack bars $c'$ thus the section is securely supported. When it is desired to raise or lower the section the turning knob $f'$ is turned in the opposite direction which withdraws the arms from the rack bars so that the section is free to move up or down at the will of the operator, and when the right height has been secured the knob is again turned, securing the section in place.

Figure 4:
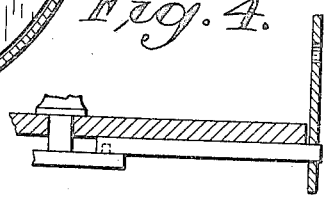
Fig. 4 shows a modified form.

As shown in Fig. 4, instead of using the vertical rack bars I may use a series of holes and have the ends of the arms engage with these.

What I claim is:—

A display device comprising a receptacle having retaining means extending substantially from the top to the bottom thereof, a vertically movable and adjustable section fitted thereto for altering the effective depth of the receptacle, and means for supporting the section in its adjusted position comprising a turning knob supported by the section and extending through the same carrying a disk on its lower end with a space between it and the lower face of the section, pins on said disk extending upwardly, horizontally movable arms having their outer ends engaging the retaining means and their inner ends located between the disk and the section, the pins working in inclined slots in the arms to give proper movement thereto in the turning of the knob, substantially as described.

In testimony whereof, I affix my signature.

GEORGE F. ALBERT.

Copies of this patent may be obtained for five cents each, by addressing the "Commissioner of Patents, Washington, D. C."